US007934532B2

(12) United States Patent
Ribi

(10) Patent No.: US 7,934,532 B2
(45) Date of Patent: May 3, 2011

(54) TAPE FOR MASS-SEALING BOTTLES AND SIMILAR CONTAINERS, AND APPARATI FOR ITS APPLICATION AND REMOVAL

(75) Inventor: Leon Antoine Ribi, Montreux (CH)

(73) Assignee: Ribi Pack S.p.A., Genova (IT)

( * ) Notice: Subject to any disclaimer, the term of this patent is extended or adjusted under 35 U.S.C. 154(b) by 0 days.

(21) Appl. No.: 12/383,570

(22) Filed: Mar. 25, 2009

(65) Prior Publication Data

US 2009/0184085 A1 Jul. 23, 2009

Related U.S. Application Data

(62) Division of application No. 10/440,269, filed on May 19, 2003, now Pat. No. 7,510,756, which is a division of application No. 09/355,392, filed on Aug. 9, 1999, now Pat. No. 6,564,846.

(51) Int. Cl.
*B32B 38/10* (2006.01)

(52) U.S. Cl. ........ 156/584; 156/344; 53/381.1; 414/411

(58) Field of Classification Search .................. 156/344, 156/584; 53/381.4, 492, 381.1; 414/411
See application file for complete search history.

(56) References Cited

U.S. PATENT DOCUMENTS 3,803,795 A * 4/1974 Ouellette ........................ 53/492
4,338,767 A * 7/1982 Cochran ......................... 53/492
4,658,568 A * 4/1987 Reid et al. ....................... 53/410
4,759,457 A * 7/1988 Nakayama .................... 215/270
5,429,022 A * 7/1995 Nakayama ...................... 83/152
5,481,946 A * 1/1996 Nishikawa et al. ............. 81/3.2

* cited by examiner

*Primary Examiner* — Mark A Osele
(74) *Attorney, Agent, or Firm* — James Creighton Wray

(57) ABSTRACT

A composite laminar tape (1) for mass-sealing bottles (15) or similar containers consists, according to the invention, of at least one extensible laminar tape (16), made of an extensible plastomeric film, which is possibly provided with closed lines for a predetermined separation of areas being meant to act as sealing membranes.

The invention also relates to an apparatus for mass-sealing containers with said tape, and to an apparatus for mass-unsealing the containers sealed with said tape.

15 Claims, 6 Drawing Sheets

TAPE FOR MASS-SEALING BOTTLES AND SIMILAR CONTAINERS, AND APPARATI FOR ITS APPLICATION AND REMOVAL

This application is a division of U.S. application Ser. No. 10/440,269, filed May 19, 2003, now U.S. Pat. No. 7,510,756, issued Mar. 31, 2009, which is a division of U.S. application Ser. No. 09/355,392, filed Aug. 9, 1999, now U.S. Pat. No. 6,564,846, issued May 20, 2003.

This application claims the benefit of Swiss Application No. 166/97 filed Jan. 27, 1997, Italian Application No. M197A001013 filed Apr. 30, 1997, and PCT/EP98/00354 filed Jan. 23, 1998.

The invention relates to a tape for mass-sealing bottles and containers, to an apparatus for applying said tape, and to an apparatus for removing the tape from bottles or containers, and in an apparatus for unsealing them.

BACKGROUND OF THE INVENTION

Automatic lines for packaging liquid or solid products (generally but non necessarily foodstuffs) are well known, diffused, and extensively used in industry and (therefore) will not be described herein. However, in these lines, the containers (particularly for food contact packaging) must (or at least should) be washed and/or sterilized (or anyway accurately cleaned) before being filled: therefore, at the start of the packaging line, there is normally provided at least one washing step to clear the inside of containers of dust and/or other foreign matters, which may have penetrated them.

Well-known washing steps are normally able to accomplish the task wherefore they are designed and implemented but they may (or might) exceptionally fail, with harmful effects (at least in terms of commercial impact and/or image) for product packagers and vendors; as an example, one might think of a pack (of a food or non food product), inside which a purchaser/user would find a foreign body, like (for example) a mouse, a lizard and/or one or more bugs.

The jets of fluid under pressure (air and/or water), used in many well-known washing steps are not (or may not be) able to remove these foreign bodies, from the inside of a container, when they are large, or anyway as large as the mouth of the container.

To this end, the expedient of applying a seal, made of a film of extensible material, is known from the application for international patent PCT No. WO96/23702.

WO96/23702 discloses a device for sealing container openings, which permits to apply a stretch plastic film onto the openings to be sealed. Said device comprises a support, preferably flat-shaped, having at least one hole, on which is placed the stretch plastic film. Said film is held taut and adherent to the support by means of gluing, magnetic force, pressure, a counter pattern or in any other way. The device can bear marks or recognition messages, as well as a warning or an advertisement and can also be used for temporary sealing of containers.

Relating to apparati for applying the seal, WO/03478 discloses an apparatus for covering articles with a film, comprising means for relatively moving a sheet of film toward a primary surface of an article. Said sheet and said primary surface are generally parallel to one another. The article shows a secondary surface substantially perpendicular to said primary surface. The said means for moving have an extent of sufficient length to move said film towards and past said primary surface and along said secondary surface. Furthermore the apparti comprises means for circumferentially restraining said film in a plane substantially parallel to said primary surface, whereby said means for restraining causes said film to stretch as said means for relatively moving passes said primary surface.

Also document U.S. Pat. No. 3,112,587 discloses an apparatus for closing and sealing the mouth of a container. The apparatus disclosed is an apparatus for applying a sheet of heat sealable material to the mouth of a container comprising a heat sealing head, means for advancing a sheet of heat sealable material past the sealing head, means for selectively clamping the sheet of material around a central mouth spanning area, means for moving the head, the sheet material and the container relative to each other, to bring the head and the mouth of the container into engagement with opposite sides of the mouth spanning portion of the sheet whereby to heat seal the same thereto, and means for thereafter moving the head and the container in unison relative to the clamping means with the head and container in engagement with opposite sides of the sheet to separate the mouth spanning portion from the sheet. The relative motion of the clamping means, of the head and of the bottle is achieved by actively displacing each of this parts.

Document U.S. Pat. No. 4,338,767 discloses a device for removing pressure sensitive sealing tape from a container. The apparatus has a seal removal station which is positioned along a bottle conveyor line upstream of a filling operation. In the said removal station oversized adhesive seals covering the mouth of the plastic bottles and adhering to the annular edge delimiting the mouth of the bottle are lifted off each bottle and transferred to a collector bin. Vacuum pressure generated in a plenum chamber formed in a stator member is transmitted to the nonadhesive upper surface of each seal through a perforated rotor surface rotating beneath the stator. Air jet means directing fluid pressure upward against marginal portions of each seal overlapping marginal portions of each seal and guide surfaces to flatten out curled portions of the seal are utilized to assure seal lift off by virtue of fluid pressure differentials.

DE-U-296 13 476 discloses a device for unsealing bottles having crown sealings and a film covering the crown sealing and the neck of the bottle. The device having mechanical scratching means for detaching from the neck covering sheets of paper, plastic or tinfoil.

SUMMARY OF THE INVENTION

The invention is based on the problem to improve the operations of sealing and unsealing bottles or containers, before they are filled and closed in a packaging line, in such a way that these operations may be mass-implemented, in a specific line, or a part of line upstream from the line for filling and closing the containers, the whole in a simple and cheap way, both as regards the material in use, and the construction of the line, and allowing for a reduced environmental impact.

The invention achieves the above purposes by providing a composite laminar tape, for mass-sealing bottles or similar containers according to the characterising part of claim 1

The tape made of extensible film may be interposed between two support tapes having coincident holes and adhering against each other, by adhesives, embossing or other means, along longitudinal lateral stripes, outside the longitudinal lateral edges of the intervening film tape. Alternatively, the extensible film may be made to adhere to the support tape by directly gluing it thereto.

Advantageously, the extensible film weakening areas or predetermined tear-off lines, extending along closed lines, and along the edges of the holes in the support tape/s.

The invention also relates to an apparatus for mass-applying the sealing film on the mouth of bottles or similar containers, which uses a tape as described hereinbefore, and which shows the combination of features of one embodiment.

Here also, there are provided several possible embodiments, which form the subject of the following description and of the dependent claims.

The rigid element, having one surface provided with a hole, has associated means for feeding the tape, unwound from the coil, and for carrying it to an interposed position between the rigid element, i.e. its surface provided with a hole, and the opening of the container, said position being such that each hole of the support tape is sequentially carried coaxially to the hole in the rigid element.

Advantageously, downstream from the rigid element, there is provided a coil for recovering the tape once the part of film applied as a seal on the opening of the container, has been removed.

An alternative device for sealing bottles or containers according to the invention shows the combination of features according to another embodiment.

The invention also relates to an apparatus for unsealing containers, and comprising the combination of features according to another embodiment:

In a preferred embodiment, the apparatus according to the invention further comprises rotation means, which set the operating head in a rotary motion with respect to the container (or vice versa) and/or separating means, placed inside the cavity of the operating head, which partially remove the seal, by separating its edge from the outer wall of the container and by lifting it up; the seal, partially removed by the separating means, is completely removed by the suction means.

Further improvements and possible variants in construction of the laminar tape, of the apparati for the application and removal of the seal on and from the containers will form the subject of the dependent claims.

The characteristics of the invention and the advantages derived therefrom will be more apparent from the following description of some non-limiting embodiments, illustrated in the annexed drawings, in which:

DETAILED DESCRIPTION OF THE PREFERRED EMBODIMENTS

Figure 1:
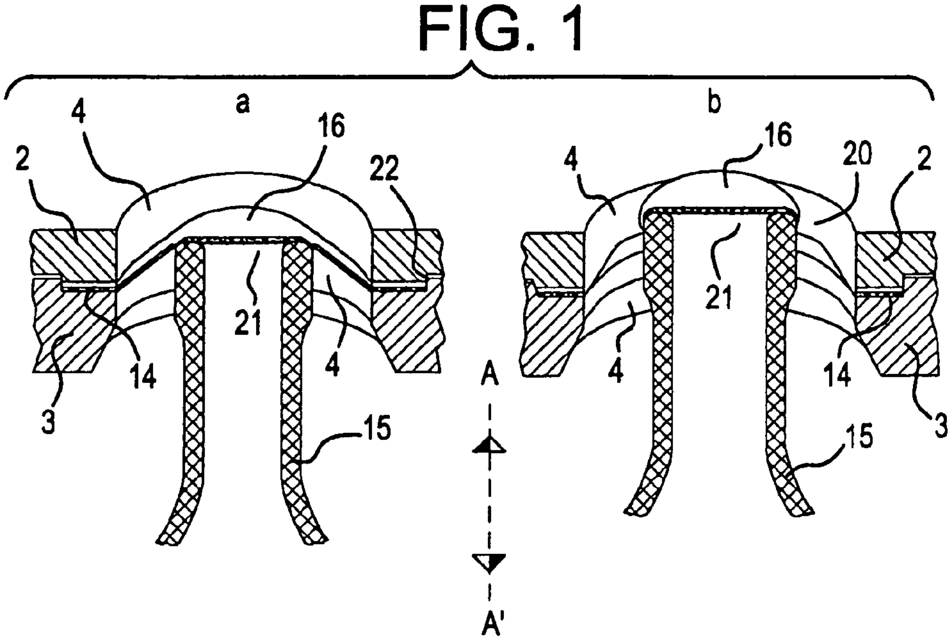
FIGS. 1*a* and 1*b* are sectional views of a bottle as seen at the moment in which the film is stretched on the edge of the opening of the bottle and at the moment after the film is torn on the edge of the bottle respectively.
Figure 2:
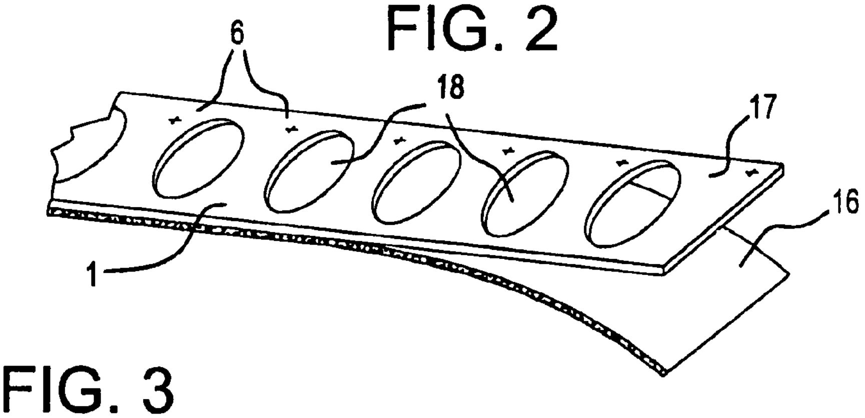
FIG. 2 shows a composite two-component tape.
Figure 3:
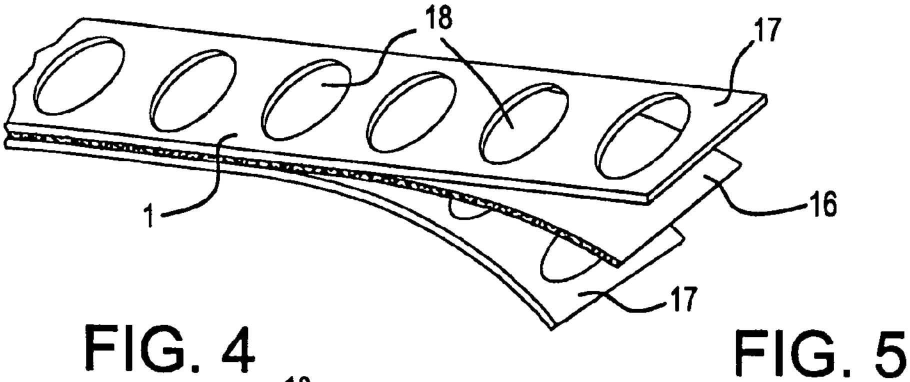
FIG. 3 shows a composite three-component tape.
Figure 4:
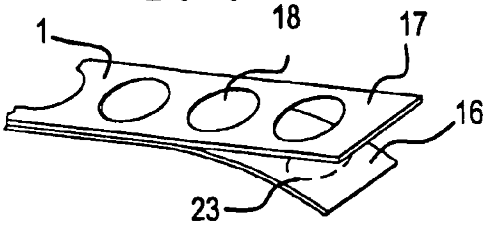
FIG. 4 shows a tape according to FIG. 2 provided with weakening holes along a closed line.
Figure 5:
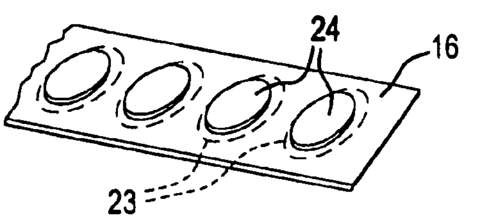
FIG. 5 shows a simple extensible plastomeric tape, provided with glued abrasion proof disks and with a weakening closed line.
Figure 6:
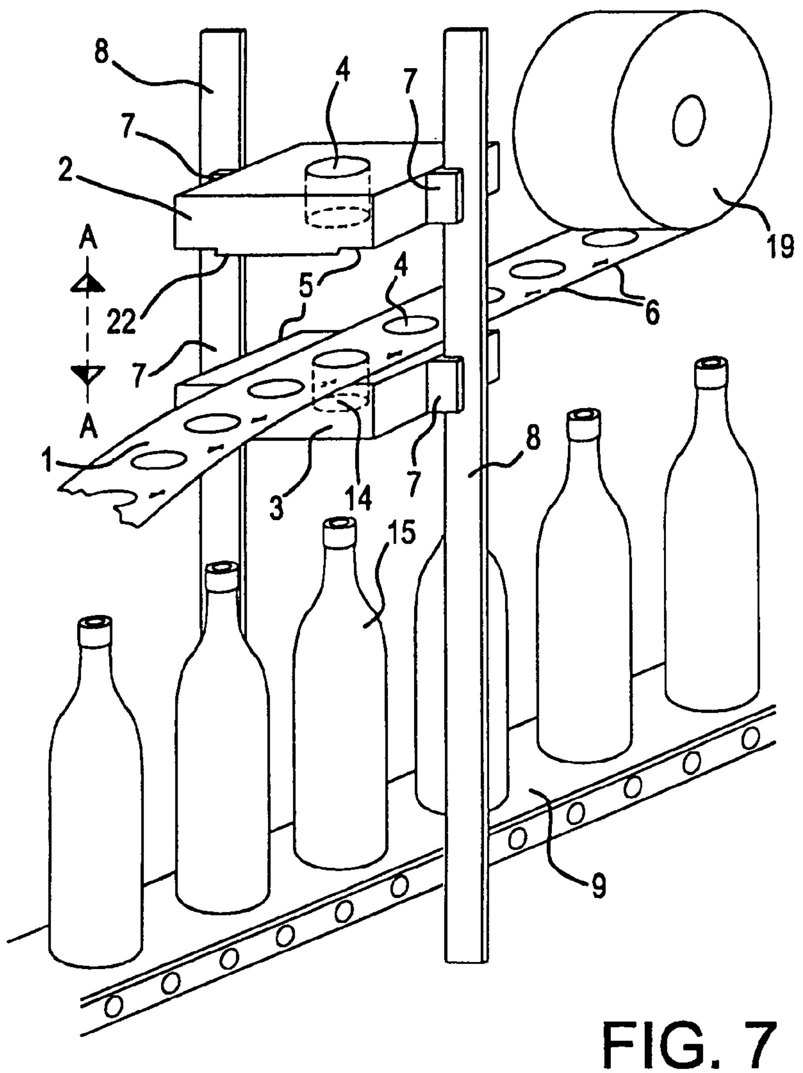
FIG. 6 shows, by a simplified scheme, a typical apparatus and tape for mass-sealing bottles.
Figure 7:
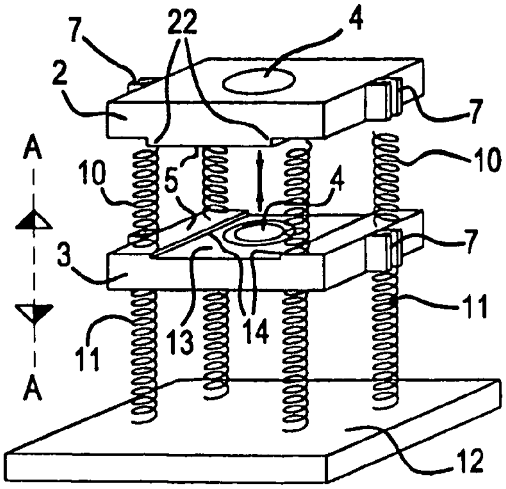
FIG. 7 shows the apparatus in its basic parts.

Referring to FIGS. 1 to 5, a composite tape 1 according to the invention basically consists of a first extensible plastomeric laminar tape 16, of the type used for food wraps, and of one or two tapes 17 acting as supports to the first tape, and being made to adhere to one or both sides thereof. The width of said tapes 16, 17 must be at least equal to the diameter of the openings to be sealed 21, plus the width of two margins, being wide enough as to enable, as will be seen hereafter, an easy grasp by the apparatus fit for the application. These margins will allow the plastomer in use to be sufficiently stretched before being torn, therefore prior to the separation of the portion of the tape applied on the container opening. This or these two tapes 17, acting as supports, unlike the first tape 16, are made of a laminated plastic material, being sufficiently strong, flexible but not extensible, so that the dimensions of the composite tape 1 may be maintained during storage and use.

Said tape or two tapes 17, acting as supports, have at least one succession of equally spaced holes 18, passing through their thickness, whose diameter is on average, but without restriction, 20% to 30% longer than that of the openings 21 to be sealed.

The centers of said holes 18 are preferably aligned on a straight line, parallel to the length of the tape 17 and passing at the middle of its width.

Other reciprocal positions of the holes 18 are also possible, based on an optimum use of the material and, as will be illustrated hereafter, on the tool used for the sealing operation. There may be provided tapes 1 having several lines of holes, which may be parallel and aligned, but also staggered, along the tape.

When the composite tape 1 has two support tapes 17 adhering on one and the other sides of the extensible plastomeric tape 16, the whole succession of equally spaced holes 18 of each tape 17 exactly matches, hole 18 after hole 18, the succession of the other. Either in case, of one or two support tapes 17, there is provided, at each hole or matched holes, a ready for use free membrane or film, having the shape of a disk, and being limited to the circumference of said holes 18. The thickness of the film forming the extensible plastomeric tape 16 generally depends on the type of opening 21 to be sealed, on sealing requirements, on ambient temperature and on the temperature of containers, on the diameter of the openings 21 of said containers and on sealing speed, i.e. rate. Furthermore, the quality of the extensible plastomer also influences the above mentioned parameters, and hence the choice of the film thickness.

Moreover, in order to obtain a better separation of the membrane adhering to the opening 21 of the sealed container 15, the extensible plastomeric tape 16, being a component of the composite tape 1, may be provided with successions of holes or microholes, whose number corresponds to that of the holes 18 formed in the support tapes 17, which holes or microholes are arranged along closed lines 23, being concentric with respect to the holes 18, formed in the support tapes 17, and hence to the openings 21 of the containers 15 to be sealed.

Said circular closed lines 23 of holes have a diameter being equal to or shorter than the diameter of the holes 18 of the support tapes 17, but anyway longer than that of the openings 21 of the containers 15 to be sealed.

Said successions of holes or microholes may also be advantageously replaced by any proper weakening of the membrane, such as by material removal, all through the thickness thereof or not, in the form of dashes, or even annular grooves, therefore by simply thinning the membrane. On the surface of said sealing membrane, i.e. on the portion of the tape 16 which is not covered by the support tape/s 17, a concentric disk 24, having a diameter equal to or shorter than the diameter of the holes 18 of the support tapes 17, but anyway longer that the diameter of the openings 21 to be sealed, and being made of a flexible and laminated, abrasion proof material, may be applied and made to adhere in any proper manner. Said disk 24, being applied to the extensible tape 16 on the side opposite the one in direct contact with the opening 21 of the containers 15 is used to protect the underlying film, when the sealed or packaged containers 15 are stored on pallets or, secondarily, to bear indications, information, dates, or even advertisements.

This disk 24 may be obtained from one of the two tapes 17, by making of a circular cut while the composite tape is being assembled. This protection is particularly useful on shipping unfilled new bottles, whose seal must be kept intact, for hygienic purposes, until bottling.

It should be noticed that the seal provided by the composite tape 1, and as will be apparent hereafter, also by the simple tape 16 described below, is mainly designed for new bottles before shipment, so as to prevent contamination during shipment and storage, and to avoid further washing operations before bottling.

Also, the composite tapes 1 and the protection disks 24 described hereinbefore, may be provided with magnetic and optical marks 6, providing information, which may be read by suitable properly placed readers, so as to enable them to control the different sealing operations.

It should be further noticed that said tapes 16 and 17 and the protection disks 24 are preferably made to adhere to each other by appropriate gluing or alternatively, welding operations, if the component materials are fit for it. Sealing may be also obtained by using another type of simple tape 16, having the same functions as the above composite tape 1. Said simple tape consists of a single tape-like extensible plastomeric lamina, having suitable thickness and consistency.

In this case, since no inextensible support tapes 17 are available, said tape 16 must have a sufficient thickness to ensure a sufficient strength against deformations. This thickness, a determining factor for a successful application, is influenced by the type of opening to be sealed, by sealing requirements, by ambient temperature, by the temperature of containers 15, by the diameter of the openings 21, and by the sealing rate.

In order to allow the membrane to be torn at predetermined locations, once it is applied on the opening 21 to be sealed, with no excessive elongation of the plastic material, this tape 16 is provided with successions of holes or microholes, or with equivalent weakening areas, in the form of any suitable material removal, or even of grooves, obtained by pressing suitable matrices thereon, along closed lines 23, being concentric with respect to the openings 21 of the containers 15 fed for being sealed, and with respect to the holes 4, formed on the plane surfaces 5 of the members 2, 3 of an apparatus fit for the application of tapes 1, 16, as will be apparent from the following description of said apparatus, and having diameters equal to or shorter than the diameter of said holes 4, but longer than the diameter of the openings 21 of the bottles 15 or similar containers to be sealed.

This simple tape 16 may also be provided with abrasion-proof protection disks 24, adhering thereto, properly positioned, and provided with optical or magnetic marks, and having the same functions, locations, and operating conditions as the disks previously mentioned as regards the composite tape 1.

An advantageous embodiment of an apparatus for applying tapes 1, 16 according to the invention, particularly for their mass-application, basically consists of two basic rigid members 2, 3, preferably made of metal, each having a plane surface 5. Said plane surfaces 5 have holes, the basic form providing one hole for each surface, whose diameter is longer than that of the openings 21 to be sealed. This diameter depends on various factors, like the diameter and type of openings 21, ambient temperature, and the temperature of containers 15, the processing speed and the quality of the plastomer in use, only to mention the most important dependence factors.

The two plane surfaces 5 face each other in the assembled apparatus, and their holes 4, preferably but not restrictively having equal diameters, are concentric when said surfaces 5 come into contact. Said members 2, 3 may be moved relatively to each other along a path parallel to the center axes of their holes 4. Said members 2, 3 can move along said path thanks to guide means 7 or equivalent throats formed in the material of the members 2, 3 or applied thereto. Said guide means 7 have slide axes perpendicular to the plane surfaces 5 of the two members 2, 3.

The section and number of said guide means 7 are not essential, and may be selected according to design requirements, provided that they only allow the members 2, 3 to perform longitudinal sliding movements, as indicated above.

Said guide means 7 slide along stationary guides 8, whose length depends on the stroke the two members 2, 3 are meant to cover relative to each other and joined together.

In the preferred embodiment, the two members 2, 3 are provided with any suitable type of springs 10, acting between the members 2, 3, i.e. opposing a predetermined force against the approach of their plane surfaces 5. Said springs 10, applied in any proper manner between said surfaces 5 or in equivalent positions, may also be calibrated by any suitable traditional system.

The stroke of said springs 10 must allow the plane surfaces 5 to move away from each other to a sufficient extent, enabling the tape 1, 16 to slide freely between said plane surfaces, in practice, for example about 2 or 3 mm, i.e. at least the sum of the height of the rim 27, of the thickness of the tape 1, 16 and of the clearance required for an efficient operation.

Also, said apparatus may be provided with one or more further springs 11 of any suitable type, which are stiffer than the above mentioned first springs 10, i.e. oppose a stronger resistance to their deformation. Said stiffer springs 11 adhere between the two joined members 2, 3, that is between one of the two members, i.e. the upper one, and one or more suitable fixed points. The minimum predetermined load of said second springs 11 must be such as to allow the two joined members 2, 3 to move only when, due to an external force acting along the axes of the holes 4, the first springs 10 yield, allowing contact between the two plane surfaces 5, and at the same time, a sufficient pressure to be produced on the tape 1, 16, which is meant to be secured between said members 2, 3. Substantially, supposing F is the minimum external force to move the two joined members 2, 3, f is the minimum load of the second springs 11, p is the minimum pressure required on the tape 1, 16 in order to keep it ready for use, and s is the surface of the tape 1, 16 in contact with the surfaces of the members 2, 3, which grip it, the following will be obtained:

$$F>(f+p\times s)$$

In another more complex embodiment, the springs 10, 11 may be replaced by a desmodromic system, wherein both the relative motion between the two members 2, 3 and the integral motion thereof are driven, in either direction, by elements which alternately transmit oppositely directed forces.

Figure 9:
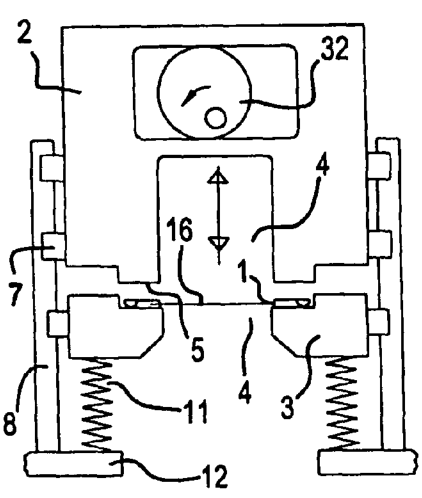
FIG. 9 shows a simplified apparatus, driven by a simple eccentric desmodromic mechanism.

These elements may be cams 32 or eccentrics, as desired (see FIG. 9).

These elements, while rotating, may first approach the two members 2, 3 and move them together in the same direction, and then, still rotating, drive them together away, and separate them again, to start a new cycle. These cams 32 or eccentrics for performing to and fro movements may be either provided with throats 33, or with peripheral guides, or assisted by synchronized counter-cams 34 or counter-eccentrics. Suitable adjustable registers or compensating springs or even hydraulic compensators may be used for adjusting clearances.

In order to guide the tape which slides between the two surfaces 5 of the two members 2, 3 of the apparatus, one of the two members, preferably the lower one, may have a notch 14 with a rectangular section whose width allows the passage of the tape 1, 16, with the necessary clearance, and whose height is smaller than the relative stroke of the members 2, 3, whereas the opposite member has a complementary ridge 22, allowing for contact between the two plane surfaces 5 around the holes 4.

Furthermore, in order to keep the free membrane of the tape 1, 16 always properly stretched, when the tape is gripped between the two members 2, 3, preferably the upper one, is provided with a rim 27, projecting beyond its surface 5 and located around the edge of its hole 4, and with a movable torus 25, having at least one surface of revolution whose generating lines are parallel to its axis of revolution, placed concentrically around the hole 4.

This torus 25 may move with its axis of revolution along the common axis of the two holes 4, and is guided by a cylindrical surface of an appropriate annular, concentric housing made in the member. This housing 26 has its cylindrical surface in direct contact with the surface of revolution of the torus 25 with such a clearance as to allow it 25 to slide.

The torus 25 is opposed by appropriate springs 29, preferably three and in a 120° disposition, operating between one plane of the torus perpendicular to its axis of revolution, and one plane, opposite thereto, being the bottom of the above mentioned annular housing 26. The movable torus 25 has a plane side, opposite to the one bearing the springs 29, provided with annular grooves 30 or ridges 30, which are complementary to as many ridges or grooves 13 made on the plane 5, concentrically with respect to its hole 4, of the member opposite to the one with the housing 26.

When the torus 25 and its housing 26 are lacking, the grooves and ridges 30 may be simply formed on the two opposite surfaces 5 of the members 2, 3 and, if they are sufficiently deep, they may provide a generic radial tension of the free membrane.

The movable upper member of the apparatus may be also provided with an elastic stopper 31, whose diameter is equal to or slightly longer than the diameter of the openings 21 of the containers 15 to be sealed, and which contacts the side of the membrane, opposite to that in contact with the opening 21, when said membrane is stretched, on its application.

This stopper 31 may be either a simple disk made of an elastomer of any suitable type, or a rigid disk covered by an elastic gasket attached to a rod, 35 and driven thereby. Said rod may slide along a hole, formed in the upper member and its axis is perpendicular to the plane 5 of the upper member. The sliding movement of said rod 35 is opposed by a suitable spring 36, preferably placed around the rod 35.

When the apparatus is idle, the contact surface of the stopper 31 will be at the same level, or a little higher than the plane 5 of the upper member.

The application of the tapes 1, 16 is obviously not limited to their use with the apparatus disclosed above and claimed below, but may be also hand-operated or operated by manual tools. The use of the apparatus described above is useful for mass-sealing.

Sealing

The sealing method with the tapes 1, 16 and with the apparatus for the mass-application thereof, which form the subject of the present invention makes use of a container feed system, mainly but not exclusively of the belt-driven type. This system may be advantageously be one of the systems currently in use in existing equipment, being used for filling bottles or other containers, for closing them with plugs, for example capsules, or other types of plugs, as well as for labeling bottles or containers. In this case, the existing equipment is provided generally with belt conveyors combined with mechanisms for applying various plugs or capsules, in a cyclic movement.

Advantageously, the apparatus for mass-applying seals according to the invention may be incorporated in said equipment, making use of the container conveyor system, as well as, if possible, of the mechanisms which drive the operating units for plug application, which may be used for driving the apparatus described above.

Therefore, the feed system of said equipment may have one or more apparati for application of the tape 1, 16 according to the invention, combined therewith, instead of the usual elements for application of traditional plugs or capsules. The apparatus, appropriately driven, will apply the membranes of the tape 1, 16 on the openings 21 of the containers 15, which are sequentially fed at synchronous intervals, under the apparatus.

Figure 8:
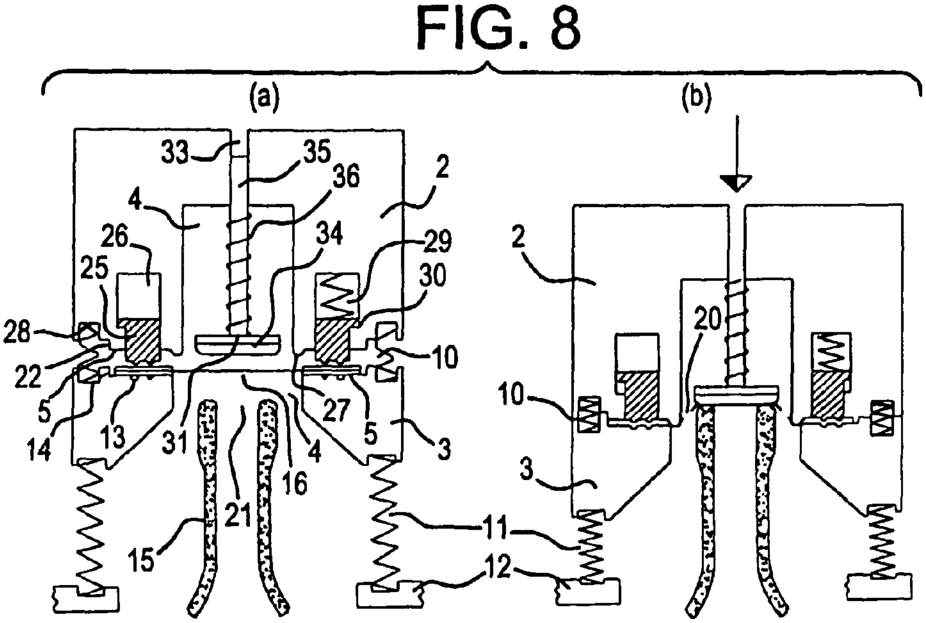
FIGS. 8*a* and 8*b* are sectional views of the apparatus, provided with a stopper, with a toric member and with a rim, with the two members of the apparatus at the top dead center and the bottle to be sealed, and with the two members of the apparatus at the bottom dead center and the bottle already sealed respectively.

More in detail, the application of said sealing membranes is executed as follows (see FIG. 8):

The tape 1, 16, available in coils 19, is properly unwound and fed with discrete movements, i.e. in steps, each covering a distance corresponding to that between two adjacent holes 17 in the composite tape 1, or between two weakening closed lines 23, in case of a simple tape 16. These discrete advancements are followed by synchronized stops. The tape 1, 16, which alternately advances and stops, passes between the two planes 5 provided with holes, of the two horizontal movable members 2, 3, possibly guided by the notch 14 and by the opposite ridge 22.

Any appropriate mechanical actuator, appropriately controlled, even by the marks 6 on the tape 1, 16, feeds the holes 18, formed in the support tapes 17 or, in case of a simple tape 16, the weakening closed lines 23, concentrically with respect to the holes 4 of the plane surfaces.

When the tape 1, 16 stops, the upper member, opposed by the springs 10 and possibly also by the springs 29 of the movable torus 25 is brought, with its plane surface 5 or with the surface of the torus 25, provided with grooves 30 or ridges, into contact with the plane surface 5 of the lower member, by the action of a force provided by any suitable mechanical, either pneumatic or hydraulic, actuator, also controlled by the marks 6.

While the two members 2, 3 approach, the movable torus 25 is pushed to enter its housing 26 until the two opposite plane surfaces 5 come into contact, whereas its grooves 30 or ridges, opposite to the complementary ridges or grooves 13 of the lower member grip the tape 1, 16 at least with the force of the above mentioned, preferably three, springs in a 120° arrangement.

When the two members 2, 3 further approach, the projecting rim 27 inside the hole 4 of the upper member stretch the membrane enclosed by the holes 4 of the two members 2, 3 of the apparatus.

The tape 1, 16, which is so tightly stretched, is ready for being applied.

Here, an increase of the force applied on the apparatus will press the springs 11, acting between the two joined members 2, 3 and one or more external fixed points, and will approach both joined members 2, 3, and therefore the sealing membrane stretched therebetween, to the opening 21 of the containers 15 to be sealed. As this movement continues, the sealing membrane will first contact the edge of the opening 21, while the stopper presses it against the opening. As the movement progresses, the membrane will be stretched and made to firmly adhere to the edge, until the intensity of the force applied causes the membrane to be torn 20 along a closed line around or near the edge of the opening 21.

Said tearing effect 20 may be, as previously mentioned, be assisted or located by annular successions of holes or microholes or other weakening areas.

In case of a simple tape 16, the tearing effect will forcedly occur along said weakening areas. If the tape 1 is not provided with said annular weakening areas, the tearing effect 20 will be produced anyway, and will be located in the areas wherein the maximum resistance of the membrane is exceeded, after the plastic stretching deformation. In practice, said tearing effect 20 will occur along a more or less irregular closed line.

Once the membrane is applied and torn, the joined members 2, 3 of the apparatus will move up again, in the opposite direction, by a simple release of the force applied, thanks to the action of the springs 11. Then, a further release of said force will enable the separation of the two members 2, 3 thanks to the action of the springs 10 and, possibly, of the springs 29.

When the dead center of each member 2, 3 is reached, the apparatus is ready for a new cycle.

In case of an apparatus driven by a mechanical desmodromic system, the two members 2, 3 will get back to their top dead center will be obtained by the rotation of the cams 32.

Figure 10:
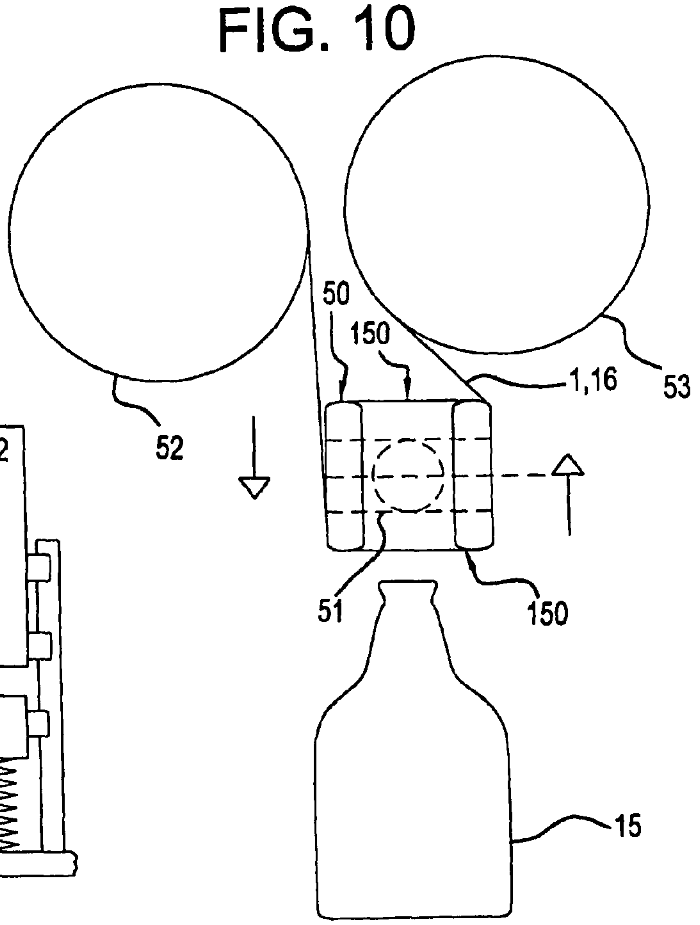
FIGS. 10, 11, and 12 show a simplified variant embodiment of the apparatus according to the invention.
Figure 11:
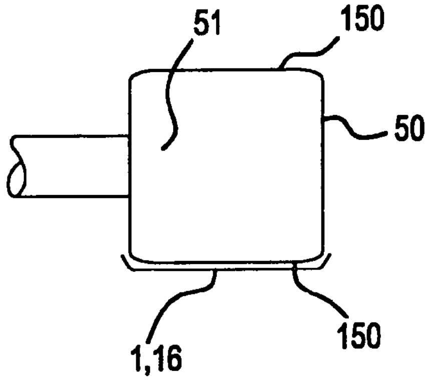
Figure 12:
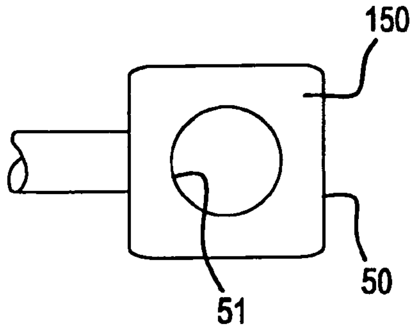

FIGS. 10 to 12 show a variant embodiment of the apparatus according to the invention, particularly but not exclusively fit for being used in combination with the simple tape 16.

In this embodiment, the apparatus is provided with an applicator head 50, having at least one plane surface, with a notch 51 having a predetermined depth. The applicator head is supported is such a way as to project and be able to slide alternately in the two directions, parallel to the axis of the notch 51. Advantageously, in this embodiment, the notch has a cylindrical shape. The simple tape 16, for example a common film, made either of an extensible plastic material, of the type being used for food contact, easily available on the market, or of the type according to the present invention, is unwound from a coil 52, passed along the surface of the head 50, which has appropriately rounded edges, and advanced towards a roller for winding scrap tape or film, indicated as 53.

In this, case, the tape 16 or film are advanced around the operating head 50, so as to form a curve and to stretch the film, making it adhere against the surface of the operating head 50.

The two reels 52, 53 are mounted on unwinding/winding axes, suitably synchronized to allow the tape to advance as previously described with reference to the first embodiment of the apparatus. Tension may be provided either by a corresponding differential rotation between the axes of the two rollers 52, 53, or by the provision of a brake on the axis of the unwinding roller 52.

As is apparent, this embodiment is very simple and certainly effective. It ensures, like the previous embodiment of the apparatus, mass-application of the sealing membrane on the openings 21 of any container. Further, whenever the format or type of container is changed, the applicator head 50 is much more easily replaced.

According to an advantageous embodiment, the applicator head 50 may have a polyhedral shape, with a plurality of faces, extending tangential to a cylindrical surface, whereas the head is mounted in such a way as to be movable not only parallel to the axis of the notches 51, formed in said faces, but also angularly about an axis which coincides with the axis of the cylinder tangent to said faces 151.

If geometrically possible, i.e. if the geometry of the applicator head 50 has two parallel and diametrically opposite faces 150, the notches may be formed as through holes, having a desired shape and diameter.

In this case, besides advancing the tape 16 or film along the applicator head 50, the latter may be also rotated to such an extent as to bring the next face to the operating position of the previous face. The applicator head 50 is projectingly supported by a shaft 54, which is carried, together with the rotary drive, by sliding means, parallel to the axis of the notches.

This embodiment also allows the provision of different notches on the same applicator head 50, which are brought to the operating position, when needed, by a simple rotation.

The surface/s 150 and/or the connection edges are conformed in such a way as to obtain the highest adherence of the tape thereon, so as to assist the gripping effect. The surfaces may be made of metal or of a suitable plastic material, particularly properly smoothed or of a type fit for generating also an electrostatic adherence of the tape.

The single-layer tape 16, made of an extensible material, may consist of a film of extensible plastic, of the type widely available for domestic use, and commonly present on the market.

The rotating applicator head 50 may also be used to control automatic gauged unwinding of the tape 16 or film, whereas the roller 53 for winding the scrap tape must simply recover the length of exceeding tape delivered by the applicator head 50.

To this end, the tape 16 or film cooperate with the edges of the polygonal applicator head 50, acting as driving teeth and engaging the elastically extensible film.

The sealing membrane is torn from the tape 16 or film, as described above.

Unsealing Apparatus

Since the tape and apparatus according to the invention have the object to temporarily seal containers and bottles before their usage as containers for product packaging, the invention would not solve completely and effectively the sealing problems, if it did not provide an effective, simple, fast and cheap apparatus for unsealing the bottles and containers sealed according to the method and with the means described above.

Some examples of unsealing apparati are shown in FIGS. 13 to 19.

Figure 13:
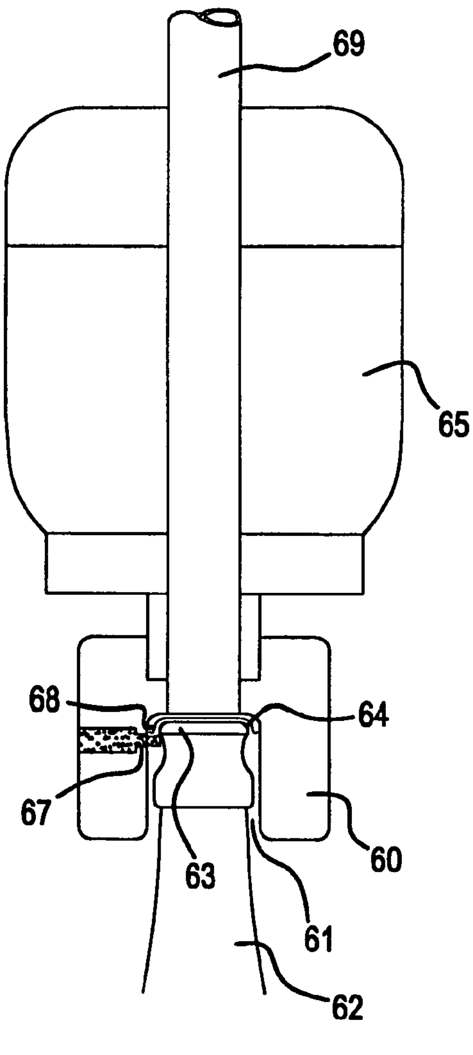
FIGS. 13 and 14 are schematical views of a first embodiment of an apparatus, according to the invention, for unsealing a bottle.

FIG. 13 schematically shows a first embodiment of a bottle unsealing apparatus according to the invention. FIG. 13 shows:

the operating head 60, in a sectional view, to show the inner cavity 61, whose shape is complementary to that of the outer wall of the bottle 62, a seal 64 (consisting of a membrane or film made of an extensible material) being applied to the mouth 63 thereof, by proving adhesion between the edge 68 of the seal 64 and the outer wall of the neck of the bottle 62: the neck of the bottle 62 is inserted in the inner cavity 61 of the operating head 60;

the rotation means 65, which set the operating head 60 in rotary motion with respect to the bottle 62; without departing from the scope of the invention, it is possible to use rotation means (known per se), for rotating the bottle 62 with respect to the operating head 60;

the separating means 67, placed inside the inner cavity 61 of the operating head 60, which partially remove the seal 64, separating the edge 68 of the seal 64 from the neck of the bottle 62 and lifting it up;

the suction means, connected to the inner cavity 61 of the operating head 60, at the mouth 63 of the bottle 62, for removing, through the hollow shaft 69, the seal 64, which has already been partially removed by the separating means 67.

According to a possible embodiment, not shown in the figures, the apparatus according to the invention only comprises the operating head 60, the translation means 66 and the suction means.

In FIG. 13, the rotation means 65 consist of a motor (preferably, but not exclusively, an electric motor) whose hollow shaft 69 has an operating head 60 rigidly connected thereto: this motor is attached to the translation means 66 (illustrated, by way of a non-limiting example, in FIG. 18), allowing the operating head 60 to translate vertically with respect to the mouth 63 of the bottle 62; without departing from the scope of the invention, it is possible to use translation means (known per se) for vertically translating the bottle 62, so as to insert its neck in the operating head 60 and extract it from the operating head 60 respectively.

Still within the scope of the invention, the rotation means 65 may consist of a mechanism for transforming a translatory motion of the bottle 62, with respect to the operating head, into a rotary motion of a hollow shaft having the operating head 60 attached thereto: preferably, but not necessarily, this mechanism (which is not described herein as it is known per se) is driven by the pressure exerted by the mouth 63 of the bottle 62 on the operating head 60, after a further translatory movement of the bottle 62 with respect to the operating head 60, once the neck of the bottle 62 has been inserted in the operating head 60.

Figure 17:
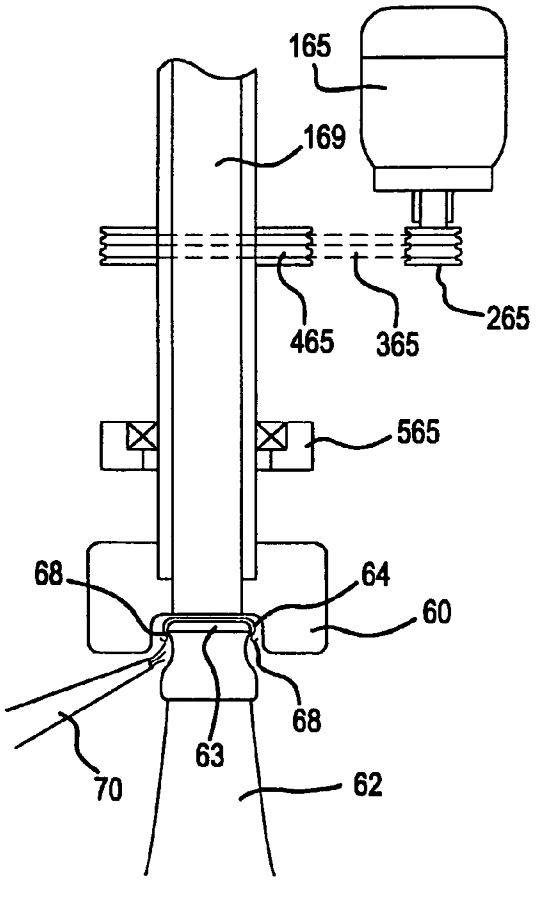
FIG. 17 is a schematical view of a second embodiment of an apparatus according to the invention.

In the embodiment shown in FIG. 13, the separating means 67 (which may be omitted, without departing from the scope of the invention; FIG. 17) consist of one or more brushes, made of a rigid, or semi-rigid material (one of which is shown in FIG. 13) sliding against the edge 68 of the seal 64, separating it from the neck of the bottle 62 and lifting it up; without departing from the scope of the invention, it is possible to make use of other mechanical means, acting as separating means 67, such as scrapers, strands and/or any other mechanical means (known per se) being functionally fit for the purpose.

The suction means comprise a pump (or other functionally equivalent means such as a Venturi tube), connected to the hollow shaft 69 of the motor 65 (included in the suction means), which creates a negative pressure inside the cavity 61, near the seal 64: this negative pressure first tensions the film forming the seal 64, assisting the operation of the separating means 67, and then removes this film.

Since the seal 64 closes the mouth 63 of the bottle 62 tightly, any difference in pressure and/or temperature between the places and moments in which the seal 64 is applied and removed could generate a negative pressure inside the bottle 62, which is higher than that (having an opposite "direction") generated by the suction means: in this case, the negative pressure generated inside the bottle 62 might suck in the seal 64, partially removed by the separating means 27.

In order to avoid such risk, the apparatus according to the invention comprises (or may comprise) means for puncturing the seal 64 before or after removal thereof.

Preferably, but not necessarily, these puncturing means consist of a needle, of a blade and/or other means, known per se, being functionally fit for the purpose.

Then, the seal 64 (and/or its fragments, if the seal 64 is torn while being removed) is separated from the air flow generated by the suction means: the means for separating the seal 64 from said air flow, the pump, and the means (rigid and/or flexible tubes, joints, etc.) for connecting the hollow shaft 69 of the motor 65 will not be described herein as they are known per se and anyway not relating to the present invention.

Preferably, but not necessarily, said means for separating the seal 64 (or fragments thereof) from the air flow comprise means for detecting the passage of the seal 64 (or fragments thereof), thus verifying that the bottle 62 has been unsealed.

Said detecting means may be of the photoelectric cell type, or any other functionally equivalent type, and will not be described herein as they are known per se.

Without departing from the scope of the invention, it is possible to connect said pump to an end of a tube, which is inserted in the hollow shaft 69 of the motor 65, being free to rotate with respect to it, for example being mounted on ball bearings.

The operation of the apparatus according to the invention, shown in FIG. 13 will be now briefly described.

Once the sealed bottle 62 is positioned under the operating head 60, said operating head 60 is lowered by the translation means (or the bottle 62 is lifted) until the operating head 60 fits closely the neck of the bottle 62, the seal is (possibly) punctured and the suction means are operated, together with the rotation means 65, which rotate the operating head 60 being rigidly connected to the separating means 67 which, sliding against the edge 68 of the seal 64, separate it from the neck of the bottle 62 and lift it up: the suction means displace the seal 64, which has already been partially removed by the separating means 67, from the mouth 63 of the bottle 62.

Figure 14:
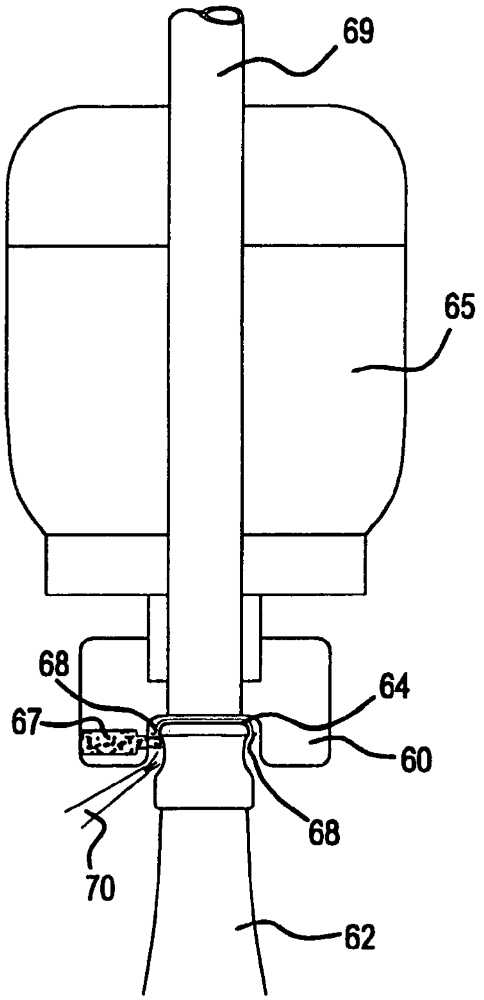

In a possible embodiment, not shown in the figures for the sake of graphic simplicity, the suction means are "operated" by opening a valve at the end of the hollow shaft connected to the operating head 60. FIG. 14 schematically shows an apparatus according to the invention, differing from the one of FIG. 13 in that the separating means 67 comprise, in addition to said mechanical means (in FIG. 14 one or more brushes made of a rigid or semi-rigid material), one or more nozzles 70 (only one being shown in FIG. 14), each blowing, in the cavity 61 of the operating head 60, a jet of fluid (preferably but not necessarily air) under pressure which slips under the edge 68 of the seal 64, separates it from the neck of the bottle 62, and lifts it up.

The synergic action of the mechanical means and of the fluid jets (FIG. 14) makes the separating means 67 more effective but, without departing from the scope of the invention, it is also possible to use only mechanical means (FIG. 13) or only fluid jets (FIG. 17) as separating means 67.

Figure 15:
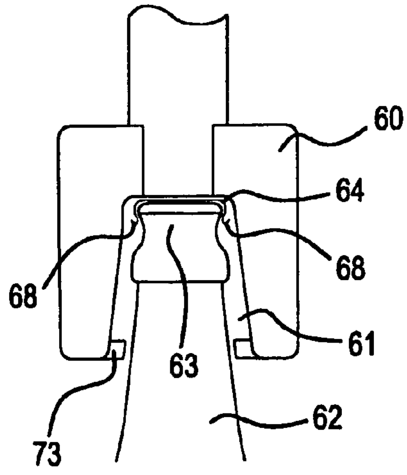
FIG. 15 is a schematical view of a first alternative embodiment of the operating head.

FIG. 15 schematically shows a first alternative embodiment of the operating head 60, differing from the one described above in that it does not comprise the separating means 67.

FIG. 15 shows the operating head 60, in a sectional view to show the inner cavity 61; the neck of the bottle 62, on whose mouth 63 the seal 64, with the lifted edge 68 is applied; a hollow tube, included in the suction means attached to the operating head.

This hollow tube may be the hollow shaft 69 of the motor, included in the rotation means 65 (omitted in FIG. 15 for the sake of graphic simplicity), a hollow tube, included in a mechanism for transforming a translation motion into rotary motion, a tube inserted in the hollow shaft 69, or the hollow tube 169 shown in FIG. 17.

The negative pressure generated inside the cavity 61 of the pump, included in the suction means, must be sufficient to remove the seal 64 from the mouth 63 of the bottle 62, without the help of the separating means 67.

In order to assist the action of said negative pressure, improving the reliability of an apparatus according to the invention, which is equipped with an operating head 60, of the type shown in FIG. 15, sealing means 73, which, in the embodiment illustrated in FIG. 15 consist of a gasket with a toroidal shape, are placed preferably but not necessarily at the mouth of the cavity 61.

In order to obtain an effective "sealing" effect of the means 73, limiting the quantity of air "infiltrating" inside the cavity 61 along the neck of the bottle 62, the dimensions of the opening of the toroidal sealing means 73 are substantially similar to the dimensions of the outer wall of the neck of the bottle 62.

The sealing means 73 may be advantageously used also with the operating heads 60, shown in figures 13 and 14.

Figure 16:
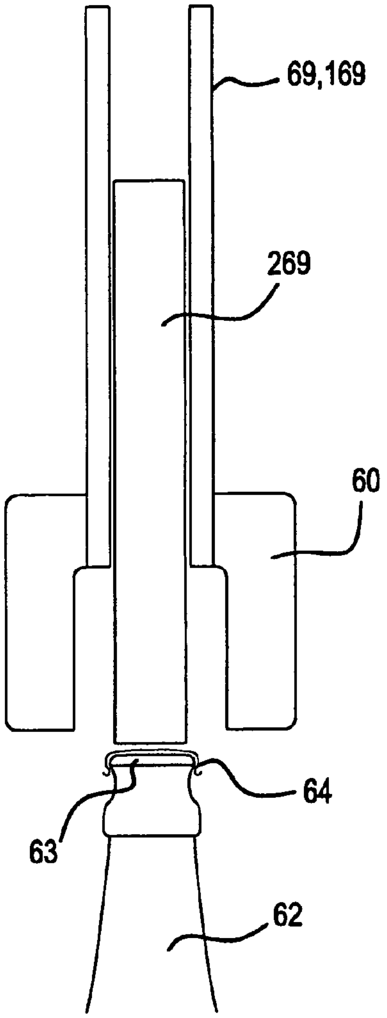
FIG. 16 is a schematical view of a second alternative embodiment of the operating head.

FIG. 16 schematically shows a second alternative embodiment of the operating head 60, basically differing from those shown in FIGS. 13, 14, 15 and 17 in that it comprises a second tube 269 arranged to slide inside the tube 69, 169 respectively, which has the suction means and the operating head 60 connected thereto.

Once the sealed bottle 62 is positioned under the operating head 60, the tube 269 is first brought to contact the seal 64, for lifting the seal 64 and preventing it from falling inside the bottle 62, then the operating head 60 is fitted closely on the neck of the bottle 62, to remove the seal 64 from the mouth 73 of the bottle 62.

FIG. 17 schematically shows a second embodiment of an apparatus according to the invention, differing from the one described above in that the rotation means 65 comprise a motor 65 (preferably but not necessarily an electric motor), mechanically coupled to a tube 169, included in the suction means, having the operating head 60 rigidly connected thereto: the tube 169 is slidable in the bearing means (which, in FIG. 17, consist of a ball bearing placed inside a support provided with holes) and is integral to the translation means 66, not expressly shown in FIG. 17.

In FIG. 17, the motor 165 is mechanically coupled to the tube 169 by transmission means, consisting of pulleys 265 and 365, which are keyed on the shaft of the motor 165 and to the tube 169 respectively, and connected by connection means 465, consisting, for example, of one or more belts or other functionally equivalent means; without departing from the scope of the invention, it is possible to use any kinematic chain, known per se (consisting, for example, of one or more gears), suitable for mechanically coupling the motor 165 to the tube 169.

Figure 18:
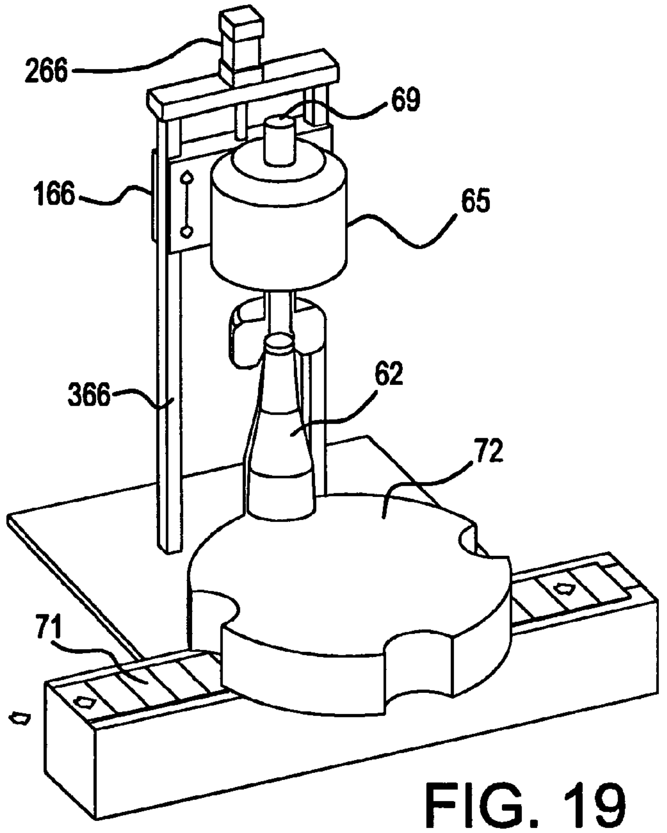
FIG. 18 is a schematical view of a step of a packaging line, comprising an apparatus according to the invention.

FIG. 18 schematically shows a step of the packaging line comprising an apparatus according to the invention;

FIG. 18 shows (only by way of non limiting example) a possible embodiment of the translation means 66, comprising a saddle 166, sliding along a pair of vertical guides 366 and moved by driving means 266, consisting of a pneumatic or hydraulic cylinder, of mechanical cams or any other functionally equivalent means.

FIG. 18 also shows the rotation means 65, carried by the saddle 166 and the hollow shaft 69 (which may have the tube 169 located therein, not expressly shown in FIG. 18), attached to the operating head 60 (in a partially sectional view, so as to show the inner cavity 61) and one of the (rigid or semi-rigid) brushes, acting as the separating means 67.

A sealed bottle 62 is picked up from the conveyor belt 71 by the "star-shaped" apparatus 72, brought under the apparatus according to the invention, for the removal of the seal 64 and replaced on the conveyor belt 71 by the "star-shaped" device 72.

Preferably, but not necessarily, the machine of FIG. 18 may be equipped with first means (for example a tracer point) for controlling that the mouth 63 of the bottle 62 has no seal 64 thereon (nor fragments thereof), and that the latter are not inside the bottle 62.

The second means may advantageously consist of means for detecting marks (for example: bars traced with a magnetic ink) on the seal 64.

These first and second means, omitted in FIG. 18 for the sake of graphic simplicity, will not be described herein, as they are known per se.

Figure 19:
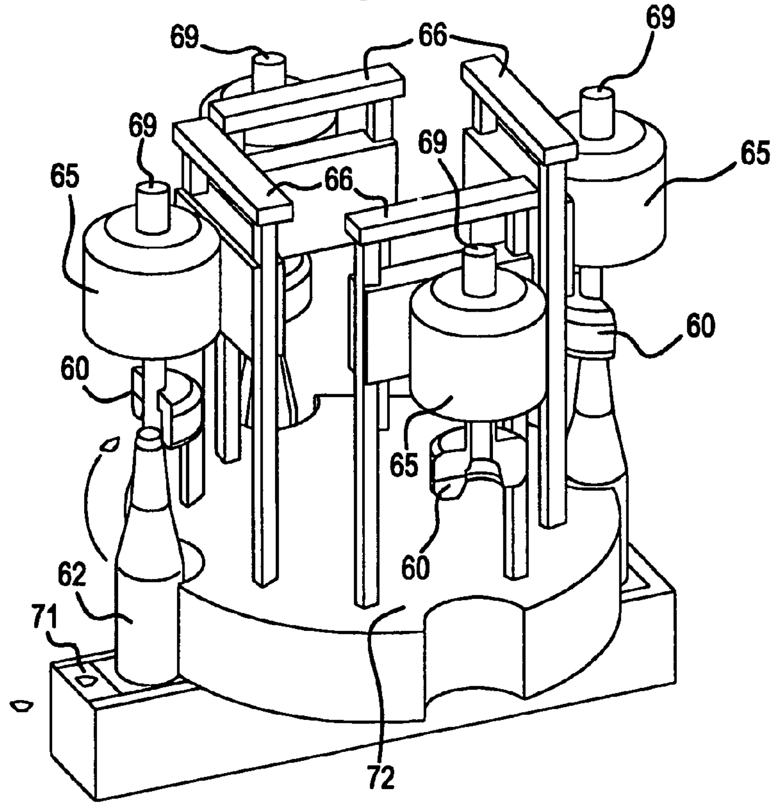
FIG. 19 is a schematical view of a step of a packaging line comprising a plurality of apparati according to the invention.

FIG. 19 schematically shows a step of a packaging line with a higher productivity than that of FIG. 18, because it comprises a plurality of apparati according to the invention (like the one shown in FIG. 18), for "treating" several bottles 62 at the same time.

To this end, the apparati according to the invention are mounted on the star-shaped device 72 and rotate therewith: while an unsealed bottle 62 is replaced on the conveyor belt, the seal 64 of another bottle 62 is removed and another sealed bottle 62 is picked up from the conveyor belt.

In order to increase the number of bottles 62 to be "treated" at the same time, it is sufficient to increase the number of notches along the periphery of the "star-shaped" device 72, and the number of apparati according to the invention, mounted on the "star-shaped" device 72.

Still without departing from the scope of the invention, the apparatus for unsealing a container, which forms the subject of the present disclosure, might be modified and improved by a skilled person, according to current experience and natural technical evolution.

The invention claimed is:

1. A combination of an apparatus for unsealing a bottle or similar container, with bottles or similar containers having a seal formed by a film of extensible plastic material, the said sealing film adhering for its entire extension also on a certain part the outer axial wall of the bottle end surrounding the opening wherein the apparatus comprises:

a) an operating head, having a cavity whose shape is complementary to that of the outer wall of the bottle or similar container, in the zone surrounding the mouth of said container wherein the seal means to be removed are applied, said cavity being arranged to receive said zone of said container, surrounding said mouth;

b) translation means, arranged to set the operating head in a translatory motion, vertical to said container;

c) suction means, connected to said cavity, in said operating head, near said mouth of said container, and arranged to remove said seal means from said mouth of said container;

d) separating means, placed inside said cavity of said operating head, and arranged to partially remove said seal means from said outer wall of said container, separating the edge of said seal means and lifting it up;

e) said suction means removing said seal means, which have already been partially removed by said separating means from said mouth of said container;

further comprising rotation means, for setting said operating head in a rotary motion, with respect to said container, said rotation means comprise a motor, which is integral to said translation means, the shaft of said motor being hollow, said operating head being rigidly connected to said hollow shaft.

2. An apparatus as claimed in claim 1, further comprising sealing means, placed at the mouth of said cavity of said operating head, the opening of said sealing means not being smaller than said outer wall of said container in the area surrounding said mouth of said container.

3. An apparatus as claimed in claim 1, wherein said hollow shaft of said motor is included in said suction means.

4. An apparatus as claimed in claim 1, wherein it comprises a tube, included in said suction means, inserted inside said hollow shaft of said motor, said tube, included in said suction means, being free to rotate with respect to said hollow shaft of said motor.

5. An apparatus as claimed in claim 1, wherein said motor, included in said rotation means, is an electric motor.

6. An apparatus as claimed in claim 1, wherein said motor is coupled by transmission means to a tube, included in said suction means, which is movable inside bearing means and is integral to said translation means of said operating head, being rigidly connected to said tube.

7. An apparatus as claimed in claim 6, wherein said motor, included in said rotation means, is an electric motor.

8. An apparatus as claimed in claim 1, wherein said rotation means comprise means for transforming a translatory motion of said container, with respect to said operating head, into a rotary motion of a hollow shaft, said operating head being rigidly connected to said hollow shaft.

9. An apparatus as claimed in claim 8, said means for transforming a translatory motion into a rotary motion are driven by the pressure exerted by said mouth of said container on said operating head, after a further translatory movement of said container with respect to said operating head, once said container has been inserted in said operating head.

10. An apparatus as claimed in claim 1, wherein said translation means comprise a saddle, sliding along vertical guide and moved by driving means.

11. An apparatus as claimed in claim 1, wherein said separating means comprise at least one mechanical means, placed inside said cavity of said operating head, for separating said edge of said seal means from said outer wall of said container, and for lifting it up.

12. An apparatus as claimed in claim 11, wherein said at least one mechanical means consists of at least one rigid and/or semi-rigid brush, or at least one scraper, and/or strands.

13. An apparatus as claimed in claim 1, wherein said separating means comprise at least one nozzle, for blowing a jet of fluid under pressure in said cavity of the operating head, said jet of fluid under pressure separating said edge of said seal means from said outer wall of said container and lifting it up.

14. An apparatus as claimed in claim 1, wherein it further comprises means for puncturing said seal means before, during, or after the removal of said seal means.

15. A combination of an apparatus for unsealing a bottle or similar container, with bottles or similar containers having a seal formed by a film of extensible plastic material, the said sealing film adhering for its entire extension also on a certain part the outer axial wall of the bottle end surrounding the opening wherein the apparatus comprises:

a) an operating head, having a cavity whose shape is complementary to that of the outer wall of the bottle or similar container, in the zone surrounding the mouth of said container wherein the seal means to be removed are applied, said cavity being arranged to receive said zone of said container, surrounding said mouth;

b) translation means, arranged to set the operating head in a translatory motion, vertical to said container;

c) suction means, connected to said cavity, in said operating head, near said mouth of said container, and arranged to remove said seal means from said mouth of said container;

d) separating means, placed inside said cavity of said operating head, and arranged to partially remove said seal means from said outer wall of said container, separating the edge of said seal means and lifting it up;

e) said suction means removing said seal means, which have already been partially removed by said separating means from said mouth of said container;

wherein said operating head, which is integral to a first tube, with said suction means being connected thereto, comprises a second tube arranged to slide inside said first tube, said second tube being brought into contact with said seal means, prior to the insertion of said area of said container, surrounding said mouth, in said operating head.

* * * * *